United States Patent [19]

Niwa et al.

[11] 4,436,522
[45] Mar. 13, 1984

[54] DISPERSE DYE COMPOSITION

[75] Inventors: Toshio Niwa; Susumu Nagashima, both of Kanagawa, Japan

[73] Assignee: Mitsubishi Chemical Industries Limited, Tokyo, Japan

[21] Appl. No.: 336,482

[22] Filed: Dec. 31, 1981

[51] Int. Cl.³ .................. C09B 67/38; C09B 67/40; D06P 1/613
[52] U.S. Cl. .......................... 8/524; 8/527; 8/610
[58] Field of Search ................... 8/524, 527, 610

[56] References Cited

U.S. PATENT DOCUMENTS 4,233,026 11/1980 Hitschfel et al. .................. 8/524
4,373,930 2/1983 Rothwell ........................... 8/610

FOREIGN PATENT DOCUMENTS 56-128371 10/1981 Japan ............................... 8/610

Primary Examiner—Maria Parrish Tungol
Attorney, Agent, or Firm—Sughrue, Mion, Zinn, Macpeak & Seas

[57] ABSTRACT

A disperse dye composition containing:
20 to 50% by weight of a water-insoluble or sparingly soluble dye; and
1 to 5% by weight of a water-soluble surface active agent represented by the formula:

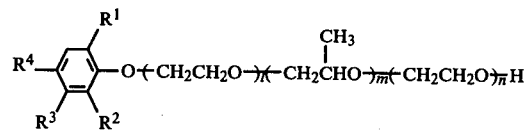

wherein $R^1$ is a hydrogen atom or an α-methylbenzyl group, $R^2$ is a hydrogen atom or an α-methylbenzyl group, $R^3$ is a hydrogen atom or a methyl group, $R^4$ is a hydrogen atom, a methyl group or an α-methylbenzyl group, any one of l and n is 0 and the other is an integer of 7 to 20, and m is an integer of 0 to 5.

2 Claims, No Drawings

DISPERSE DYE COMPOSITION

FIELD OF THE INVENTION

The present invention relates to a disperse dye composition which can be used for printing or thermosol dyeing of synthetic fibers such as polyester fibers and triacetate fibers, and mixed fibers of the foregoing synthetic fibers and natural fibers such as cellulose fibers.

BACKGROUND OF THE INVENTION

Disperse dye compositions have heretofore been prepared by adding dispersants, e.g., sulfonic acid salts of phenol-formaldehyde low condensates, to dye material in as large amounts as 0.5 to 2 times the dye material, and finely dispersing the dye material usually in water. These disperse dye compositions have very high dispersibility. It is preferred, however, to reduce the dispersant content of the disperse dye composition because the dispersant is discarded to waste water after dyeing.

Japanese Patent Application (OPI) No. 6689/78 (the term "OPI" as used herein refers to a "published unexamined Japanese patent application") discloses a water-diffusable high concentration dye composition for continuous dyeing or printing, containing a disperse dye and 30 to 150% by weight, based on the weight of the disperse dye, of a compound represented by the general formula:

$$R_1(OC_2H_4)_l(OC_3H_6)_mX$$

wherein $R_1$ is a saturated or unsaturated alkyl group containing 1 to 20 carbon atoms, an acyl group containing 4 to 30 carbon atoms, or an aryl, alkaryl or aralkyl group containing 6 to 30 carbon atoms, l is an integer of 1 or more, m is 0 or an integer of 1 or more, $l+m$ is from 35 to 200, $l/m$ is at least 2, X is a hydroxyl group, $OSO_3M$, $SO_3M$, $OPO_3HM$ or $OPO_3M_2$, and M is an alkali metal ion or a quaternary ammonium ion.

The above dye composition increases the viscosity due to a large amount of the dispersant used to the dye and a large molecular weight of the dispersant, and causes disadvantages such as generation of heat, foaming or the like in the production steps. Further, the dye composition is not satisfactory in the dispersion and coloration properties.

SUMMARY OF THE INVENTION

The object of the invention is to provide a disperse dye composition in which as compared with the conventional disperse dye compositions, the amount of a dispersant used is greatly reduced while holding very high dispersibility, and which has a high concentration of dye material.

The present invention provides a disperse dye composition comprising 20 to 50% by weight of a water-insoluble or sparingly soluble dye and 1 to 5% by weight of a water-soluble surface active agent represented by the general formula:

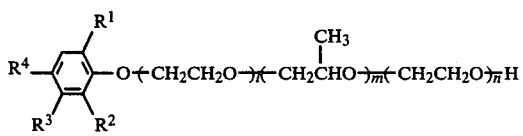

wherein $R^1$ is a hydrogen atom or an α-methybenzyl group, $R^2$ is a hydrogen atom or an α-methylbenzyl group, $R^3$ is a hydrogen atom or a methyl group, $R^4$ is a hydrogen atom, a methyl group or an α-methylbenzyl group, any one of l and n is 0 and the other is an integer of 7 to 20, and m is an integer of 0 to 5.

DETAILED DESCRIPTION OF THE INVENTION

The essential components of the disperse dye composition of the invention are a water-insoluble or sparingly soluble dye, and a water-soluble surface active agent represented by the general formula (I):

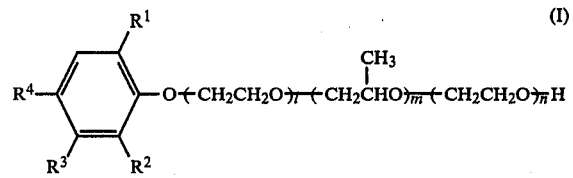

wherein $R^1$, $R_2$, $R^3$, $R^4$, l, m and n are the same as defined above.

Water-insoluble or sparingly soluble dyes which can be used include disperse dyes which are usually used, e.g., anthraquinone, azo, quinophthalone, methine and heterocondensed ring-based dyes. The concentration of the disperse dye in the present disperse dye composition is from 20 to 50% by weight.

The water-soluble surface active agents represented by the general formula (I) above can be easily prepared, for example, by reacting phenol, m-cresol or p-cresol with sytrene, ethylene oxide or propylene oxide by a known method. These water-soluble surface active agents can be used alone or in combination with each other. The concentration of the water-soluble surface active agent in the disperse dye composition is from 1 to 5% by weight.

The disperse dye composition of the invention is prepared by dispersing the above-described disperse dye in water by the use of the water-soluble surface active agent represented by the general formula (I). If desired, the disperse dye may be dispersed in a water-soluble organic solvent, e.g., methanol, ethanol, propanol, ethylene glycol, tetrahydrofuran and dioxane, or a mixed solution of the foregoing water-soluble organic solvent and water.

The disperse dye composition of the invention may contain, as optional components, a wetting agent, an anti-foaming agent, a hydrotrope agent, an anionic dispersant, and so forth. Wetting agents which can be used include ethylene glycol, propylene glycol, glycerin, 1,5-pentanediol, diethylene glycol and low molecular weight polyethylene glycol having a molecular weight of about 200 to 400. Anti-foaming agents which can be used include silicone-based anti-foaming agents, e.g., FS Antifoam 544 (trade name) by Dow Corning Corp., pluronic-based anti-foaming agents, e.g., Adekanol LG-21 (trade name) by Asahi Denka Kogyo K.K., and alcohol-based anti-foaming agents, e.g., Surfinol 104 E (trade name) by Nisshin Chemical Co., Ltd. Hydrotrope agents which can be used include urea and dimethylurea. Anionic dispersants which can be used include ligninsulfonic acid salts, sulfonic acid salts of a phenol-formaldehyde low condensate, and sulfonic acid salts of a naphthalene-formaldehyde low condensate.

The disperse dye composition of the invention is prepared in the same manner as for the preparation of the conventional disperse dye compositions. For example, the water-insoluble or sparingly soluble dye material is finely pulverized, and a mixture of 0.5 to 10 parts by weight, preferably 15 to 50 parts by weight, of the fine dye material, 0.5 to 10 parts by weight, preferably 1 to 5 parts by weight, of the water-soluble surface active agent represented by the general formula (I), and if necessary, a wetting agent, an anti-foaming agent, an anionic dispersant, a hydrotrope agent, and so forth is added to a water and/or a water-soluble organic solvent to make the total weight 100 parts by weight. The resulting mixture is then pulverized to particles having a particle size of 0.01 to 10 microns, preferably 0.01 to 1 micron, and dispersed by the use of a colloid mill, e.g., a sand grinder and a paint conditioner, to prepare a liquid disperse dye composition.

The viscosity of the disperse dye composition of the invention is very low since the amount of the water-soluble surface active agent as used as a dispersant is small, and therefore, the fluidity, workability during the production thereof, and yield are good. Furthermore, because of low viscosity, dilution dispersibility with water is good and handling is easy.

The use of the surface active agent represented by the general formula (I) greatly increases the dispersibility of the dye. This permits to increase the concentration of the dye material in the composition to nearly twice those of the conventional compositions. Furthermore, since the precipitation of dye particles with a lapse of time is scarcely observed although the viscosity is very low, the dye compositiion can be stored for long periods of time.

In addition to the above-described advantages, the disperse dye composition of the invention has the feature that dyeing costs are markedly improved for such reasons as (1) the fixing ratio of the dye at dyeing is very high, (2) as compared with the conventional disperse dye compositions, the amount of the dye required for obtaining the same surface density for fibers is greatly reduced, (3) it is not necessary to use coloration aids such as deep dyeing agents, and (4) the load of disposing dyeing waste water is reduced.

The invention is hereinafter explained in greater detail with reference to the following examples and comparative examples although it is not limited thereto.

Methods of testing various physical properties of disperse dye compositions, methods of dyeing, and a method of measuring the dyeing strength are as follows:

1. Dye Concentration

A disperse dye composition of the amount of 0.5 g was weighed and diluted to 100 ml with water, and 1 ml of the resulting solution was taken and diluted to 100 ml with an 80% aqueous acetone solution (acidic, containing 0.1% of acetic acid). The absorbance (nm) of the solution at λ max was measured with that of Comparative Example as a standard (100).

2. Viscosity

The viscosity of a disperse dye composition was measured by the use of a BL viscometer (produced by Tokyo Keiki Co., Ltd.) under the following conditions:
Temperature: 20° C.
Rotor Used: No. 1
Number of Rotation of Rotor: 6 and 30 rpm 3. Particle Size A disperse dye composition of the amount of 0.5 g was weighed and diluted to 100 ml with water. The resulting aqueous dye solution was filtered through a quantitative filter paper (produced by Toyo Roshi Co., Ltd.) as set forth below, and the particle size was determined by the state of dye particles remaining on the filter (a filtration particle size testing method).

| Type of Filter paper | Measure for Passage of Particles |
| --- | --- |
| 5A | 7μ under |
| 5B | 3μ under |
| 5C | 1μ under |

4. Dispersibility in Water

A disperse dye composition of the amount of 0.4 g was weighed and diluted to 100 ml with water. The resulting aqueous dye solution was transferred into a 100-ml graduated cylinder, was allowed to stand at room temperature for 2 hours, and then a 10 ml fraction was withdrawn from the top of the cylinder (this is referred to as "top fraction") and another 10 ml fraction from the bottom of the cylinder (this is referred to as "bottom fraction"). For each fraction, the dye concentration was measured by the use of the dye concentration-measuring method described in (1) above. The dispersibility in water was calculated by the following equation:

$$\frac{\text{Dye concentration of top fraction}}{\text{Dye concentration of bottom fraction}} \times 100 = \text{dispersibility in water (\%)}$$

5. Heat Stability

A disperse dye composition was heated under the conditions as set forth below, and the fluidity thereof was examined.
Dye thermo-regulated bath
Temperature: 60° C.
Time: 1 hour 6. Stability in Storage A disperse dye composition was allowed to stand at room temperature for 180 days, and the precipitation of dye particles was examined.

7. Dyeing Method and Dyeing Strength Measuring Method (1) Printing Method

Polyester silk satin cloth was screen printed with a color paste having the following formulation:

| | Amount (% by weight) |
| --- | --- |
| Disperse dye composition | 3 |
| Stock paste | 60 |
|     Processed starch-based paste (produced by Shorten Corp., trade name: Solvitose C-5) | 5 |
|     Filament derivative-based paste (produced by Adati Koryo Co., Ltd., trade name: Cellncol PBL 600) | 5 |
|     Processed natural rubber-based paste (produced by Meyhole Corp., trade name: Neypro Gum NP) | 5 |
|     Water | 85 |
| Tartaric acid | 0.3 |
| Leveling agent (produced by Nikka Kagaku Co., Ltd., trade name: Neotex CTP) | 0.1 |
| Anti-reduction agent (produced by Meisei Kagaku Co., Ltd., trade name: MS Powder) | 0.3 |
| Water | balance |

|  | Amount (% by weight) |
| --- | --- |
| (total) | 100% by weight |

It was then dried at 100° C. for 2 minutes. Thereafter, the cloth was treated at 175° C. for 7 minutes by a high temperature steaming method, and was subjected to reduction washing to obtain a printed cloth.

In Comparative Example, however, 3% by weight of a deep dyeing agent (produced by Nikka Kagaku Co., Ltd., trade name: Sunfloren SN) was added to the above color paste, and the resulting paste was used as a color paste. The cloth thus-obtained was used as a standard.

(2) Thermosol Dyeing Method

Polyester knit cloth was soaked in a pad bath having the following formulation:

|  | Amount (% by weight) |
| --- | --- |
| Disperse dye composition | 2 |
| Medium viscosity sodium alginate (produced by Kamogawa Kasei Co., Ltd., Duckalgin NSPM) | 0.1 |
| Water | 97.9 |
| (total) | 100 |

The cloth was squeezed to a pick up of 90% with a press type Mangle and dried at 130° C. for 2 minutes. Thereafter, it was treated at 200° C. for 2 minutes by thermosol and was subjected to reduction washing.

(3) Dye Strength-Measuring Method

The surface reflection ratio of printed cloth was measured by the use of a color-difference meter (produced by Nippon Denshoku Co., Ltd.), and the dyeing strength was determined with the surface reflection ratio of the printed cloth obtained in Comparative Example as a standard (100).

EXAMPLE 1

A mixture of:

30 parts by weight of azo-based disperse dye material powder represented by the formula:

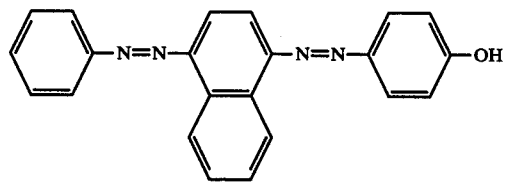

1 part by weight of a water-soluble surface active agent composed mainly of the compounds represented by the formulae:

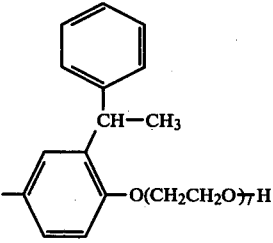

and

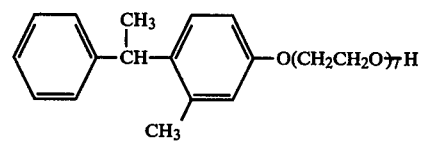

which were prepared by reacting 1 mol of a mixture of m-cresol and p-cresol with 1 mol of styrene and 7 mols of ethylene oxide, 0.05 part by weight of a pluronic-based anti-foaming agent (produced by Asahi Denka Co., Ltd., trade name: Pluronic L-61).

1 part by weight of an anionic dispersant, sulfonic acid salt of phenol-formaldehyde low condensate (produced by Nippon Nyukazai Co., Ltd., trade name: Disrol SH), and 67.95 parts by weight of water was prepared and ground at room temperature in a sand grinder to prepare a disperse dye composition.

The thus-prepared disperse dye composition was used to print polyester fibers. The formation of specks was not observed and fine printed fibers having a uniform, sharp and deep yellow color were obtained. Also, thermosol dyeing of polyester fibers provided dyed fibers having excellent leveling property, good feeling, and sharp yellow color.

Several physical properties of the disperse dye composition and the dyeing strength of cloth are shown in Table 1.

EXAMPLE 2

A mixture of:

30 parts by weight of the same dye material as used in Example 1, 5 parts by weight of a water-soluble surface active agent composed mainly of the compounds represented by the formulae:

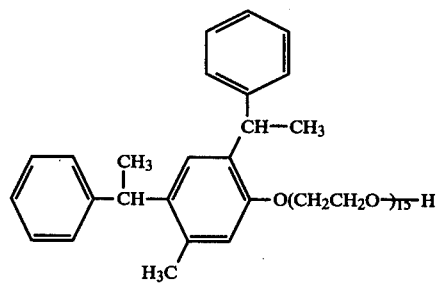

and

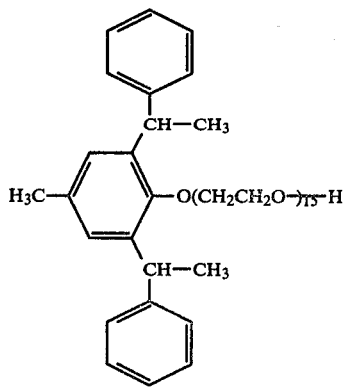

which were prepared by reacting 1 mol of a mixture of m-cresol and p-cresol with 2 mols of styrene and 15 mols of ethylene oxide, 10 parts by weight of ethylene glycol, 0.05 part by weight of a pluronic-based anti-foaming agent (produced by Toho Kagaku Co., Ltd., trade name: Pluronal 502), and 54.95 parts by weight of water was prepared and ground in the same manner as in Example 1 to prepare a disperse dye composition.

Several physical properties of the disperse dye composition, and the dyeing strength of each dyed cloth obtained by printing and thermosol dyeing are shown in Table 1.

EXAMPLE 3

A mixture of:

30 parts by weight of the same dye material powder as used in Example 1, 2.5 parts by weight of each of the same water-soluble surface active agent as used in Example 1 and Example 2, 60 parts by weight of water was prepared and processed in the same manner as in Example 1 to prepare a disperse dye composition.

Several physical properties of the thus-prepared disperse dye composition, and the dyeing strength of each dyed cloth obtained by printing and thermosol dyeing are shown in Table 1.

Also, the disperse dye composition was used to perform thermosol dyeing of mixed fibers of polyester fibers and cellulose fibers. The formation of specks was not observed, and dyed fibers having good feeling and sprinkly yellow were obtained.

EXAMPLE 4

A mixture of:

25 parts by weight of an anthraquinone-based disperse dye material represented by the formula:

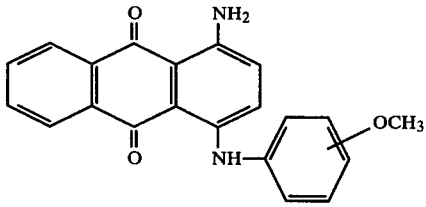

4.5 parts by weight of a water-soluble surface active agent composed mainly of the compound represented by the formula:

which was prepared by reacting 1 mol of phenol with a mixture of 2 mols of styrene and 1 mol of propylene oxide, and further reacting the resulting reaction mixture with 7 mols of ethylene oxide, 0.5 part by weight of a water-soluble surface active agent composed mainly of the compound represented by the formula:

which was prepared by reacting 1 mol of phenol with 3 mols of styrene, 1 mol of propylene oxide, and 7 mols of ethylene oxide, 0.05 part by weight of an alcohol-based anti-foaming agent (octanol) commercially available, 10 parts by weight of urea, and 54.95 parts by weight of water was prepared and processed in the same manner as in Example 1 to prepare a disperse dye composition.

Several physical properties of the disperse dye composition thus-prepared, and the dyeing strength of dyed cloth are shown in Table 1.

EXAMPLE 5

A mixture of:

25 parts by weight of the same dye material powder as used in Example 4, 2.5 parts by weight of a water-soluble surface active agent represented by the formula:

2.4 parts by weight of a water-soluble surface active agent represented by the formula:

0.1 part by weight of a water-soluble surface active agent represented by the formula:

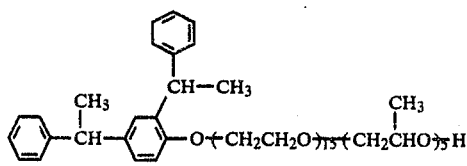

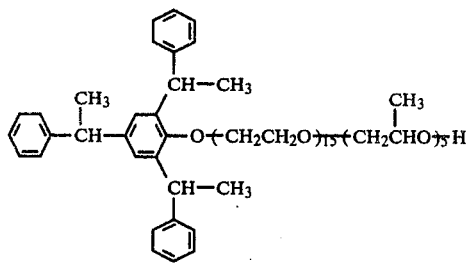

0.05 part by weight of a silicone-based anti-foaming agent (produced by Dow Corning Corp., trade name: FS Antifoam 544), and 69.95 parts by weight of water was prepared and processed in the same manner as in Example 1 to prepare a disperse dye composition.

Several physical properties of the disperse dye composition thus-prepared are shown in Table 1. Using the disperse dye composition, printing and thermosol dyeing were performed to obtain polyester dyed cloth, and the dyeing strength thereof was measured. The results are shown in Table 1.

EXAMPLE 6

A mixture of:

50 parts by weight of an anthraquinone-based disperse dye material powder represented by the formula:

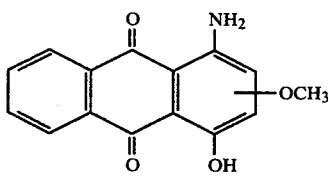

5 parts by weight of a water-soluble surface active agent composed mainly of the compounds represented by the formulae:

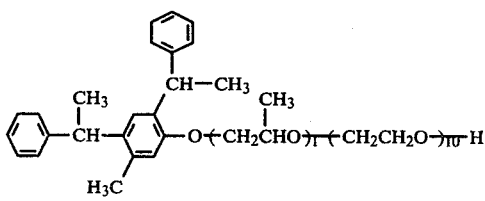

and

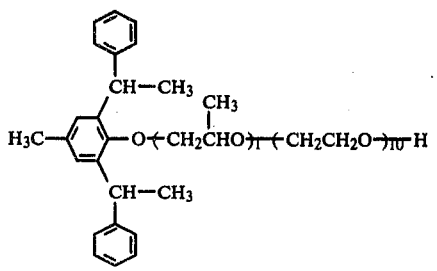

which were prepared by reacting 1 mol of a mixture of m-cresol and p-cresol with 2 mols of styrene, reacting the resulting reaction mixture with 1 mol of propylene oxide, and further reacting the resulting reaction mixture with 10 mols of ethylene oxide, and 45 parts by weight of water was prepared and processed in the same manner as in Example 1 to prepare a disperse dye composition.

Several physical properties of the disperse dye composition thus-prepared are shown in Table 1. Using the disperse dye composition, printing and thermosol dyeing were performed to obtain polyester dyed cloth, and the dyeing strength thereof was measured. The results are shown in Table 1.

EXAMPLE 7

A mixture of:

50 parts by weight of the same dye material powder as used in Example 6, 5 parts by weight of a water-soluble surface active agent composed mainly of the compounds represented by the formulae:

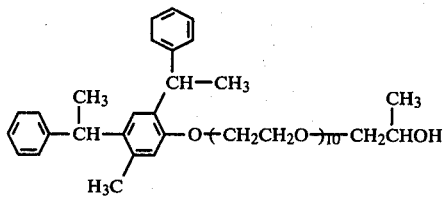

and

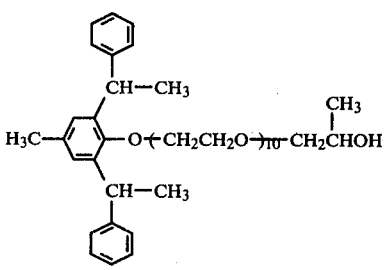

which were prepared by reacting 1 mol of a mixture of m-cresol and p-cresol with 2 mols of styrene, reacting the reaction mixture with 10 mols of ethylene oxide, and further reacting the reaction mixture with 1 mol of propylene oxide, 5 parts by weight of glycerin, 0.05 part by weight of a silicone-based anti-foaming agent (produced by Shin-Etsu Chemical Industries Ltd., trade name: Silicone KS502), and 39.95 parts by weight of water was prepared and processed in the same manner as in Example 1 to prepare a disperse dye composition.

Several physical properties of the disperse dye composition thus-prepared are shown in Table 1. Using the disperse dye composition, printing and thermosol dyeing were performed to obtain polyester dyed cloth, and the dyeing strength thereof was examined. The results are shown in Table 1.

EXAMPLE 8

A mixture of:

50 parts by weight of the same dye material powder as used in Example 6, 2.5 parts by weight of the same water-soluble surface active agent as used in Example 6, 2.5 parts by weight of the same water-soluble surface active agent as used in Example 7, 0.05 part by weight of a silicone-based anti-foaming agent (produced by Asahi Kagaku Co., Ltd., trade name: Asahi Silicone AF-145), 2 parts by weight of an anionic dispersant, lignin sulfonic acid salt (produced by Westvaco Co., trade name: Reax 85A), and 42.95 parts by weight of water was prepared and processed in the same manner as in Example 1 to prepare a disperse dye composition.

Several physical properties of the disperse dye composition thus-prepared, and the dyeing strength of polyester dyed cloth obtained by printing and thermosol dyeing using the disperse dye composition are shown in Table 1.

EXAMPLE 9

A mixture of:

20 parts by weight of the same dye material powder as used in Example 1, 4 parts by weight of a water-soluble surface active agent represented by the formula:

[Chemical structure: a compound with two phenyl rings connected via CH(CH3) groups, with -O(CH2CH2O)10(CH2CHO)7H chain and CH3 substituents]

0.05 part by weight of a silicone-based anti-foaming agent (produced by Asahi Kagaku Co., Ltd., trade name: Asahi Silicone AF-145), 2 parts by weight of an anionic dispersant, lignin sulfonic acid salt (produced by Westvaco Co., trade name: Reax 85A), 10 parts by weight of ethylene glycol, and 63.95 parts by weight of water was prepared and processed in the same manner as in Example 1 to prepare a disperse dye composition.

Several physical properties of the disperse dye composition thus-prepared and the dyeing strength of polyester dyed cloth obtained by printing and thermosol dyeing using the disperse dye composition are shown in Table 1.

COMPARATIVE EXAMPLE 1

This is a comparative example for Examples 1 to 3.

Forty five parts by weight of a sulfonic acid salt of a phenol-formalin low condensate (produced by Nippon Nyukazai Co., Ltd., trade name: Disrol SH) was used as an anionic dispersant in place of the water-soluble surface active agent of the invention. That is, a mixture of:

30 parts by weight of the same dye material powder as used in Example 1, 45 parts by weight of the sulfonic acid salt of phenol-formalin low condensate, and 25 parts by weight of water was prepared and processed in the same manner as in Example 1 to prepare a disperse dye composition.

Several physical properties of the disperse dye composition thus-prepared, and the dyeing strength of each polyester dyed cloth obtained by thermosol dyeing and printing are shown in Table 1.

COMPARATIVE EXAMPLE 2

This is a comparative example for Examples 4 and 5.

Fifty parts by weight of a lignin sulfonic acid salt (Westvaco Co., trade name: Reax 85A) was used as an anionic dispersant in place of the water-soluble surface active agent of the invention. That is, a mixture of:

25 parts by weight of the same dye material powder as used in Example 4, 50 parts by weight of the lignin sulfonic acid salt, and 25 parts by weight of water was prepared and processed in the same manner as in Example 1 to prepare a disperse dye composition.

Several physical properties of the disperse dye composition thus-prepared and the dyeing strength of dyed cloth are shown in Table 1.

COMPARATIVE EXAMPLE 3

This is a comparative example for Examples 6 to 8.

Twenty parts by weight of a sulfonic acid salt of a phenol-formalin low condensate (produced by Nippon Nyukazai Co., Ltd., trade name: Disrol SH) was used as an anionic dispersant in place of the water-soluble surface active agent of the invention. That is, a mixture of:

50 parts by weight of the same dye material powder as used in Example 6, 20 parts by weight of the sulfonic acid salt of phenol-formalin low condensate, 5 parts by weight of lignin sulfonic acid (produced by Westvaco Co., trade name: Reax 85A), and 25 parts by weight of water was prepared and processed in the same manner as in Example 1 to prepare a disperse dye composition.

Several physical properties of the disperse dye composition thus-prepared and the dyeing strength of each polyester dyed cloth obtained by printing and thermosol dyeing are shown in Table 1.

COMPARATIVE EXAMPLE 4

This is a comparative example for Example 9.

4 parts by weight of a nonionic surface active agent represented by the formula

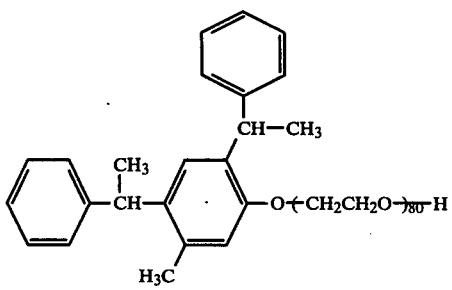

COMPARATIVE EXAMPLE 5

This is a further comparative example for Example 9.

Comparative Example 4 was followed except that 10 parts by weight of the nonionic surface active agent and 57.96 parts by weight of water were used.

Several physical properties of the disperse dye composition thus-prepared are shown in Table 1. Using the disperse dye composition, printing and thermosol dyeing were performed to obtain polyester dyed cloth, and the dyeing strength thereof was measured. The results are shown in Table 1.

TABLE 1

| | Comp. Ex. 1 | Ex. 1 | Ex. 2 | Ex. 3 | Comp. Ex. 2 | Ex. 4 | Ex. 5 | Comp. Ex. 3 | Ex. 6 | Ex. 7 | Ex. 8 | Comp. Ex. 4 | Comp. Ex. 5 | Ex. 9 |
|---|---|---|---|---|---|---|---|---|---|---|---|---|---|---|
| Dye Concentration | std. 100 | 100 | 100 | 100 | std. 100 | 100 | 100 | std. 100 | 100 | 100 | 100 | std. 100 | 100 | 100 |
| Viscosity (cps) | | | | | | | | | | | | | | |
| 6 rpm | >1000 | <50 | <50 | <50 | >1000 | <50 | <50 | >1000 | <50 | <50 | <50 | 500 | 1000 | <50 |
| 30 rpm | 500 | <50 | <50 | <50 | 700 | <50 | <50 | >1000 | <50 | <50 | <50 | 100 | 500 | <50 |
| Particle Size | | | | | | | | | | | | | | |
| 5A | o | o | o | o | o | o | o | Δ | o | o | o | o | o | o |
| 5B | Δ | o | o | o | Δ ~ x | o | o | x | o | o | o | o | o | o |
| 5C | x | o | o | o | x | o | o | x | o | o | o | o | o | o |
| Dispersibility in Water (%) | 85 | >95 | >95 | >95 | 60 | >95 | >95 | 20 | >95 | >95 | >95 | >95* | >95* | >95* |
| Heat Stability | Δ | o | o | o | x | o | o | x | o | o | o | o | o | o |
| Stability in Storage | o ~ Δ | o | o | o | Δ | o | o | x | o | o | o | o | o | o |
| Strength Printing | | | | | | | | | | | | | | |
| Without Carrier | 25 | 115 | 115 | 110 | 30 | 115 | 125 | 40 | 125 | 125 | 120 | std. 100 | 95** | 110 |
| Carrier | std. 100 | — | — | — | std. 100 | — | — | std. 100 | — | — | — | — | — | — |
| Thermosol Dyeing | std. 100 | 110 | 110 | 110 | std. 100 | 110 | 115 | std. 100 | 115 | 115 | 115 | std. 100 | 100 | 110 |

Notes:
Evaluations:
o: Excellent
Δ: Good
x: Poor
*For the evaluation of stability during thermosol dyeing, dispersibility was measured in the presence of sodium alginate (migration preventing agent).
Comparative Example 4  47%
Comparative Example 5  37%
Example 9  61%
(The same measurement of dispersibility in water was followed except that 2.0 g of the disperse dye composition was used and 0.05% sodium alginate aqueous solution was used in place of water.)
**In high pressure steaming method (130° C., 30 min), a remarkable bleed was observed.

was used in place of the water-soluble surface active agent of the invention. That is, a mixture of:

20 parts by weight of the same dye material powder as used in Example 9, 4 parts by weight of the nonionic surface active agent, 0.05 part by weight of a silicone-based anti-foaming agent (produced by Shin-Etsu Chemical Industries, Ltd., trade name: Silicone KS502), 2 parts by weight of an anionic dispersant, lignin sulfonic acid salt (produced by Westvaco Co., trade name: Reax 85A), 10 parts by weight of ethylene glycol, and 63.95 parts by weight of water was prepared and processed in the same manner as in Example 9 to prepare a disperse dye composition.

Several physical properties of the disperse dye composition thus-prepared are shown in Table 1. Using the disperse dye composition, printing and thermosol dyeing were performed to obtain polyester dyed cloth, and the dyeing strength thereof was examined. The results are shown in Table 1.

While the invention has been described in detail and with reference to specific embodiments thereof, it will be apparent to one skilled in the art that various changes and modifications can be made therein without departing from the spirit and scope thereof.

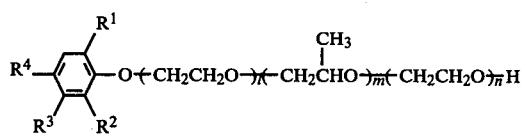

wherein $R_1$ is a hydrogen atom or an α-methylbenzyl group, $R_2$ is a hydrogen atom or an α-methylbenzyl group, $R_3$ is a hydrogen atom or a methyl group, $R_4$ is a hydrogen atom, a methyl group or an α-methybenzyl group, with the proviso that one of $R_1$, $R_2$ and $R_4$ is an α-methylbenzyl group, wherein one of l and n is 0 and the other is an integer of 7 to 20, and m is an integer of 0 to 5.
2. The disperse dye composition of claim 1 wherein said water-soluble surface active agent has the formula
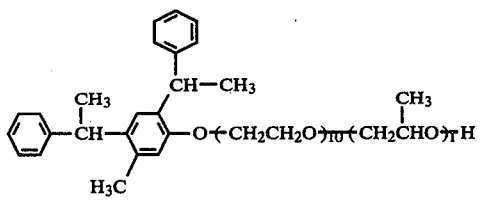

What is claimed is:

1. A disperse dye composition containing:

20 to 50% by weight of a water-insoluble or sparingly soluble dye; and 1 to 5% by weight of a water-soluble surface active agent represented by the formula: